US012785810B2

(12) United States Patent
Sato

(10) Patent No.: US 12,785,810 B2
(45) Date of Patent: Nov. 3, 2026

(54) OPTICAL TRANSMISSION EQUIPMENT, OPTICAL TRANSMISSION SYSTEM, AND RAMAN AMPLIFIER CONTROL METHOD

(71) Applicant: Fujitsu Limited, Kawasaki (JP)

(72) Inventor: Takashi Sato, Kawasaki (JP)

(73) Assignee: 1FINITY, Kawasaki (JP)

( * ) Notice: Subject to any disclaimer, the term of this patent is extended or adjusted under 35 U.S.C. 154(b) by 1066 days.

(21) Appl. No.: 17/956,068

(22) Filed: Sep. 29, 2022

(65) Prior Publication Data

US 2023/0028166 A1 Jan. 26, 2023

(30) Foreign Application Priority Data

Sep. 8, 2022 (JP) ................................ 2022-142671

(51) Int. Cl.
*H04B 10/291* (2013.01)
*H04B 10/077* (2013.01)

(52) U.S. Cl.
CPC ....... *H04B 10/2916* (2013.01); *H04B 10/077* (2013.01); *H04B 2210/08* (2013.01)

(58) Field of Classification Search
CPC .................................................... H04B 10/077
See application file for complete search history.

(56) References Cited

U.S. PATENT DOCUMENTS 10,992,374 B1 * 4/2021 Miedema ........... H04B 10/0777
2002/0076182 A1 * 6/2002 Terahara .......... H04B 10/25253 359/341.1
2002/0105715 A1 * 8/2002 Naito ...................... H01S 3/302 359/341.33
2003/0011855 A1 * 1/2003 Fujiwara ............ H04B 10/0777 398/177
2004/0213567 A1 10/2004 Deguchi et al.
2005/0078351 A1 * 4/2005 Avallone .............. H04B 10/298 359/334
2005/0117839 A1 * 6/2005 Avallone ............ H04B 10/0777 385/24
2009/0195862 A1 * 8/2009 Kondoh ................ H01S 3/1305 359/334

(Continued)

FOREIGN PATENT DOCUMENTS

JP 2004-274265 A 9/2004
JP 2010-011384 A 1/2010
JP 2022-029231 A 2/2022

*Primary Examiner* — Deandra M Hughes
(74) *Attorney, Agent, or Firm* — STAAS & HALSEY LLP

(57) ABSTRACT

Optical transmission equipment includes an optical transceiver circuit that transmits and receives signal light and supervisory light, a forward Raman amplifier provided at a transmitter end of the optical transceiver circuit, a backward Raman amplifier provided at a receiver end of the optical transceiver circuit, and a processor that controls the forward Raman amplifier and the backward Raman amplifier. When a counterpart backward Raman amplifier or a counterpart forward Raman amplifier provided at an opposite side through a fiber-optic transmission line is started up, the processor turns off a power of the forward Raman amplifier or the backward Raman amplifier according to a supervisory signal received from the fiber-optic transmission line, and releases an off state of the forward Raman amplifier or the backward Raman amplifier after a predetermined period of time.

12 Claims, 13 Drawing Sheets

(56) References Cited

U.S. PATENT DOCUMENTS

| | | | | |
|---|---|---|---|---|
| 2009/0207482 | A1* | 8/2009 | Izumi | H04B 10/075 359/334 |
| 2009/0245786 | A1* | 10/2009 | Sakamoto | H04B 10/0775 398/28 |
| 2009/0324257 | A1 | 12/2009 | Murakami et al. | |
| 2011/0141552 | A1* | 6/2011 | Ghera | H04B 10/2942 359/334 |
| 2013/0242379 | A1* | 9/2013 | Atlas | H01S 3/302 359/334 |
| 2014/0072306 | A1* | 3/2014 | Sridhar | H04B 10/071 398/16 |
| 2017/0005727 | A1* | 1/2017 | Kachita | H04B 10/296 |
| 2019/0097726 | A1* | 3/2019 | Mestre | H01S 3/06754 |
| 2022/0045755 | A1* | 2/2022 | Shukunami | H04B 10/07953 |
| 2023/0085524 | A1* | 3/2023 | Neog | G06N 3/045 359/334 |

* cited by examiner

OPTICAL TRANSMISSION EQUIPMENT, OPTICAL TRANSMISSION SYSTEM, AND RAMAN AMPLIFIER CONTROL METHOD

CROSS-REFERENCE TO RELATED APPLICATIONS

This application is based upon and claims priority to earlier Japanese Patent Application No. 2022-142671 filed Sep. 8, 2022, which is incorporated herein by reference in its entirety.

FIELD

The present documents relate to an optical transmission equipment, an optical transmission system, and a Raman amplifier control method.

BACKGROUND

Wavelength division multiplexing (WDM) transmission systems have addressed expansion of the capacity and the distance of fiber-optic transmission lines by compensating for the deterioration of the optical signal to noise ratio (OSNR) due to optical loss on the fiber-optic transmission lines. One technique for compensating for the OSNR deterioration is Raman amplification utilizing the stimulated Raman scattering effect occurring in fiber optics. So far, backward Raman pumping has been mainly employed. Backward Raman pumping injects pump light into a fiber-optic transmission line from a downstream node where the signal power has lowered, in a direction opposite to the signal travelling direction. In the next-generation WDM transmission, it is expected that bidirectional Raman pumping, which combines backward Raman pumping with forward Raman pumping, will become the main technology. Forward Raman pumping supplies pump light into the fiber-optic transmission line in the same direction as signal propagation. See, for example, Patent Document 1 presented below. Bidirectional Raman pumping or amplification is promising to further increase the transmission rate and distance of fiber-optic transmission lines.

While signal light is amplified by Raman amplification, spontaneous Raman scattering is also amplified. The amplified spontaneous Raman scattering (ASS) becomes noise, and is transmitted together with the signal light to the downstream optical node. Since the signal light and the ASS noise are indistinguishable, the pump-to-noise ratio is measured in advance to know how much ASS noise is generated when a specific pumping source is turned on, in a Raman amplifier start-up process. Based on the determined ASS noise and Raman gain, noise correction is appropriately performed, and the signal level can be controlled. For the noise and gain measurement of the Raman amplifier, optical supervisory channels (OSCs) are used to transmit and receive instructions and information items necessary for the measurement, and to transfer the measurement results between the upstream and downstream optical nodes.

During the noise and gain measurement of the Raman amplifier, the pump light of the counterpart Raman amplifier, which is provided at the opposite end of the fiber-optic transmission line so as to face the Raman amplifier to be measured, is turned off. For example, in measuring the optical amplification characteristics of the forward Raman amplifier of the upstream node, the backward Raman amplifier of the downstream node is turned off. So far, OSC communications can be maintain between the upstream and downstream optical nodes opposite each other through the fiber-optic transmission line, even if either one of the backward Raman pump source or the forward Raman pump source is turned off or powered down. However, there is a growing demand for extension of the distance of fiber-optic transmission lines without repeaters, and there may be a case where the optical loss on the fiber-optic transmission line between the optical nodes opposite each other grows to about 50 dB. In such a case, a new problem arises that the OSC communication is shut down between the optical nodes upon turning off or power down of the pump light of the upstream or downstream Raman amplifier. In general, Ethernet communication hardware using OSC small form factor pluggable (SFP) is equipped with a far-end fault indication (FEFI) function to maintain normal communication. With this FEFI function, the links of the both directions of the transmission lines are shut down upon interruption occurring in one of the directions of the transmission path. If the OSC communication is interrupted on one of the transmission paths due to turning off or power down of the Raman pumping at the upstream node or the downstream node, the OSC communication is shut down in both directions.

This technical problem will be more pronounced as the distance of the fiber-optic transmission line without an in-line amplifier increases. It is desired to provide an optical transmission equipment that autonomously recovers from OSC interruption during a bidirectional Raman pumping startup process.

Related art documents known to the inventor are

Patent Document 1: JP Patent Application Laid-open Publication No. 2022-29231; and Patent Document 2: JP Patent Application Laid-open Publication No. 2010-11384; and Patent Document 3: JP Patent Application Laid-open Publication No. 2004-274265.

SUMMARY

In an embodiment, an optical transmission equipment includes an optical transceiver circuit that transmits and receives signal light and supervisory light, a forward Raman amplifier provided at a transmitter end of the optical transceiver circuit, a backward Raman amplifier provided at a receiver end of the optical transceiver circuit, and a processor that controls the forward Raman amplifier and the backward Raman amplifier, wherein when a counterpart backward Raman amplifier or a counterpart forward Raman amplifier provided at an opposite side through a fiber-optic transmission line is started up, the processor turns off a power of the forward Raman amplifier or the backward Raman amplifier according to a supervisory signal received from the fiber-optic transmission line, and releases an off state of the forward Raman amplifier or the backward Raman amplifier after a predetermined period of time.

The object and advantages of the invention will be realized and attained by means of the elements and combinations particularly pointed out in the claims. It is to be understood that both the foregoing general description and the following detailed description are exemplary and explanatory and are not restrictive to the invention as claimed.

EMBODIMENT(S)

Figure 1:
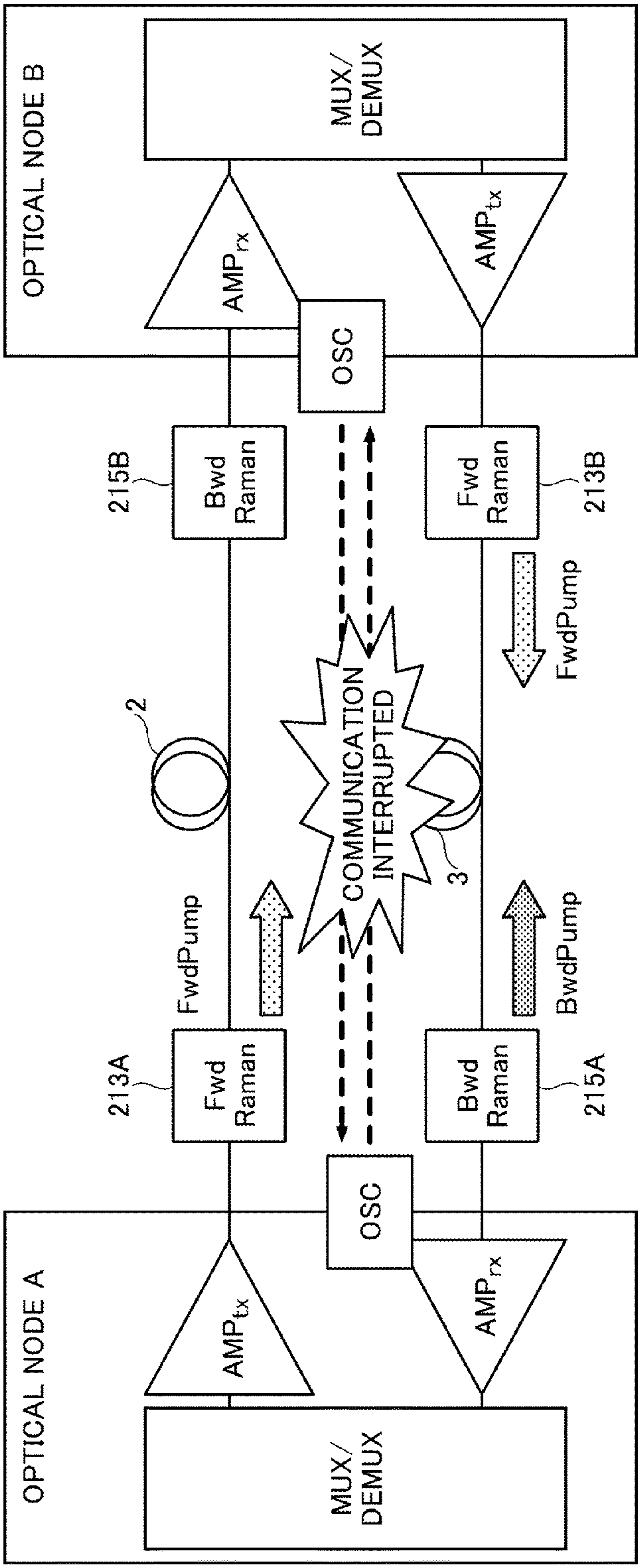
FIG. 1 illustrates a technical problem newly arising along with extension of the distance of the transmission line between optical nodes.

Prior to describing the configurations and control method of the embodiment, the technical issue newly arising along with extension of the transmission distance between optical nodes is described with reference to FIG. 1. Optical nodes A and B are mutually connected by fiber-optic transmission lines 2 and 3. On the path from the optical node A to the optical node B through the fiber-optic transmission line 2, the optical node A is an upstream node and the optical node B is a downstream node. On the path from the optical node B to the optical node A through the fiber-optic transmission line 3, the optical node B is an upstream node and the optical node A is a downstream node. Focusing on transmission from optical node A to B, a scenario in which optical node B measures a noise due to the forward Raman amplifier (denoted as "FwdRaman" in the figure) 213A of optical node A is considered.

For starting the forward Raman amplifier 213A, the noise level of the forward Raman amplifier 213A is measured at the optical node B to know the pump-to-noise ratio of the forward Raman amplifier 213A to be started. During the noise measurement, optical node A shuts down its own transmission amplifier (denoted as "AMPtx" in the figure), and instructs the optical node B to shut down the backward Raman amplifier (denoted as "BwdRaman" in the figure) 215B. The shutdown instruction is sent to the optical node B by an OSC signal. The optical node B shuts down the backward Raman amplifier 215B according to the OSC signal.

Conventionally, demand for extension of the fiber-optic transmission lines 2 and 3 has not been so severe, and the OSC signal can be received at the optical node B with the OSC power maintained above the threshold, even if the backward Raman amplifier 215B or the forward Raman amplifier 213A was shut down or powered down. However, along with the elongation of the fiber-optic transmission lines 2 and 3, the optical loss in the fiber optics increases, and the OSC power level falls below the threshold due to the shutdown of the backward Raman amplifier 215B. Thus, the OSC transmission is interrupted. Upon link-down of the fiber-optic transmission line 2, the paired fiber-optic transmission line 3 used for transmission from the optical node B to the optical node A is also shut down. After the optical node B has finished the measurement and recording of the noise level of the front Raman amplifier 213A, the measurement result cannot be transferred to the optical node A.

The optical node A is configured to set the pump power of the forward Raman amplifier 213A and adjust the pump power based on the measured noise level, but the noise information is not supplied from the optical node B. The optical node A cannot even instruct the optical node B to release the shutdown of the backward Raman amplifier 215B. The same applies to startup of the backward Raman amplifier. Namely, OSC transmission is interrupted upon shutdown or power down of the counterpart forward Raman amplifier. The issue of such OSC interruption due to the extension of the fiber-optic transmission lines has not been perceived so far, and therefore, no specific measures have been adopted to deal with the OSC interruption occurring during the startup process of Raman amplifiers.

The embodiment proposes a configuration that the optical node autonomously recovers from the OSC interruption in the process of starting up a Raman amplifier so as to promptly set up bidirectional Raman pumping. The configurations and schemes described below are just examples for embodying the technical concept of the present disclosure, and do not intend to limit the scope of the disclosure. The dimensions and the positional relationships of the components illustrated in each of the figures may be exaggerated to facilitate understanding of the invention. The same component or function may be denoted by the same reference numeral, and redundant explanation may be avoided.

<Device and System Configurations>

Figure 2:
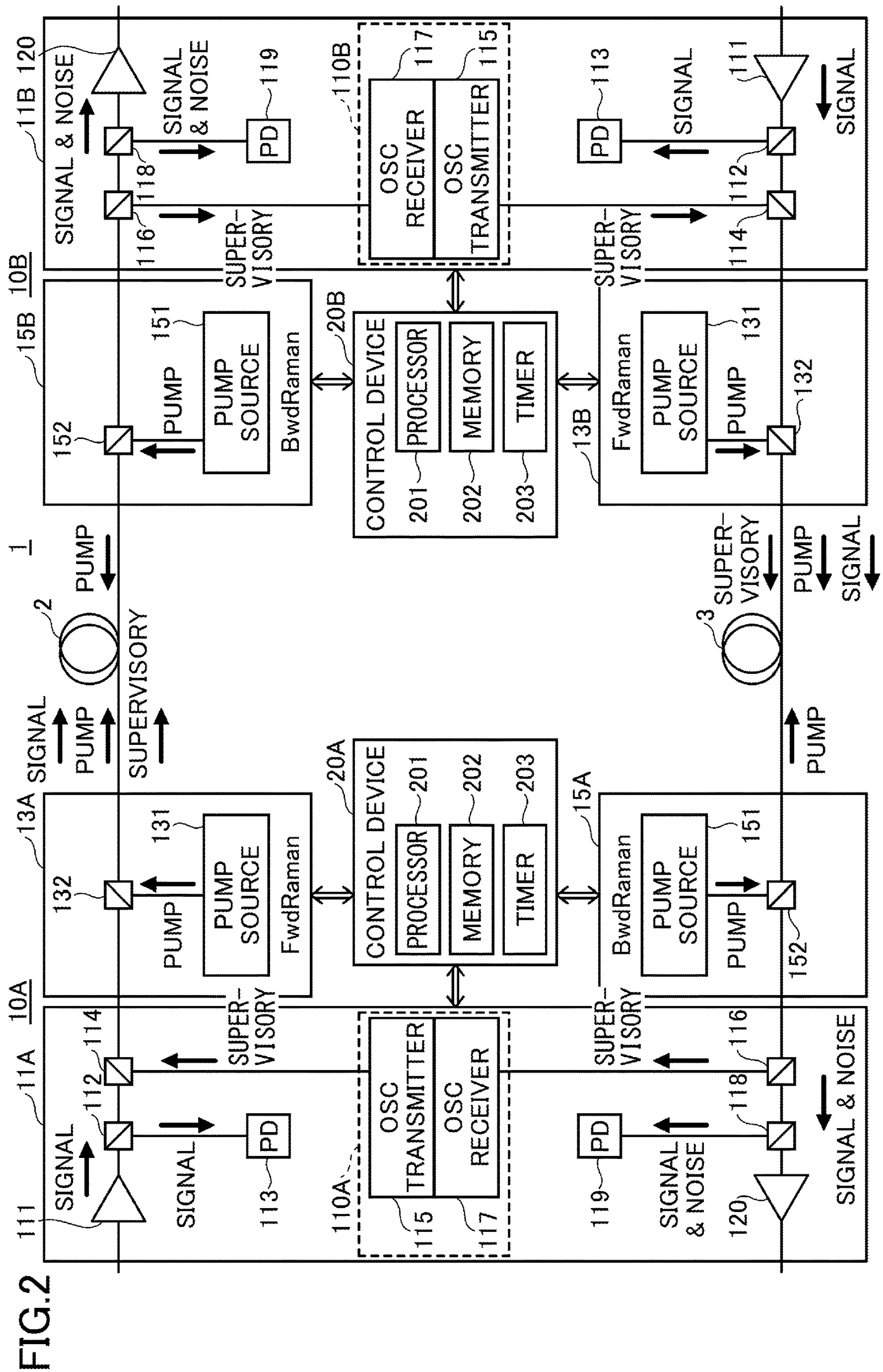
FIG. 2 is a schematic diagram of an optical transmission system using an optical transmission equipment according to an embodiment.

FIG. 2 is a schematic diagram of an optical transmission system 1 using optical transmission equipment 10A and optical transmission equipment 10B according to an embodiment. The optical transmission equipment 10A and the optical transmission equipment 10B serve as optical nodes configuring the optical transmission system 1. Two sets of optical transmission equipment 10A and 10B have the same configuration, and are mutually connected via fiber-optic transmission lines 2 and 3. On the path from the optical transmission equipment 10A to the optical transmission equipment 10B via the fiber-optic transmission line 2, the optical transmission equipment 10A is the upstream node, and the optical transmission equipment 10B is the downstream node. On the path from the optical transmission equipment 10B to the optical transmission equipment 10A via the fiber-optic transmission line 3, the optical transmission equipment 10B is the upstream node, and the optical transmission equipment 10A is the downstream node.

Since the optical transmission equipment 10A and the optical transmission equipment 10B have the same configuration, the device configuration will be explained focusing on either one of the two, for example, the optical transmission equipment 10A. The optical transmission equipment 10A has an optical transceiver circuit 11A that transmits and receives signal light and supervisory channels, a forward Raman amplifier 13A provided at the transmitter end of the optical transceiver circuit 11A, a backward Raman amplifier 15A provided at the receiver end of the optical transceiver circuit 11A, and a control device 20A. The control device 20A is connected to the forward Raman amplifier 13A, the backward Raman amplifier 15A, and the optical transceiver circuit 11A, and controls the overall operation of the optical transmission equipment 10A.

The control device 20A has a processor 201, a memory 202, and a timer 203. The timer 203 may be implemented by the functionality of the processor 201.

The processor 201 implements a controller that controls the startup process of the forward Raman amplifier 13A and the backward Raman amplifier 15A. The functional configuration of the controller and the control operation for starting up Raman amplification will be described later with reference to FIG. 3 and the subsequent figures.

The transmitter side of the optical transceiver circuit 11A has a transmission amplifier 111, an optical splitter 112, an optical monitor (denoted as "PD" in the drawing) 113, an optical coupler 14, and an OSC transmitter 115. A plurality of optical transponders which accommodate signals of different wavelengths are connected to the optical transceiver circuit 11A, and a WDM signal in which optical signals of a plurality of wavelengths are multiplexed is incident onto the transmission amplifier 111. The transmission amplifier 111 is, for example, an erbium doped fiber amplifier (EDFA) to amplify the WDM signal over a wide band. A portion of the WDM signal amplified by the transmission amplifier 111 is split by the optical splitter 112, and input to the optical monitor 113. The optical monitor 113 is a photodetector such as a photodiode (PD), and measures the power of the WDM signal light to be incident onto the fiber-optic transmission line 2.

The OSC transmitter 115 generates an OSC signal containing supervisory information. The supervisory channel is generated by performing intensity modulation on a light beam having a different wavelength from the WDM signal. The wavelength of the supervisory channel may be set adjacent to the WDM signal band, for example, on the shorter wavelength side of the WDM signal band. The supervisory channel output from the OSC transmitter 15 is incident through the optical coupler 114 onto the fiber optics that transmits the WDM signal, and is input to the fiber-optic transmission line 2.

The forward Raman amplifier 13A has a pump source 131 and an optical coupler 132. By amplifying the WDM signal input to the fiber-optic transmission line 2 using the front Raman amplifier 13A, the input power to the optical amplifier 120 of the counterpart node is increased, and OSNR deterioration due to ASE occurring in the optical amplifier 120 is reduced.

The pump source 131 has a plurality of light source elements (for example, i laser diodes, where "i" is an integer greater than or equal to 2) with different wavelengths in order to amplify the signal light over the WDM band. The pump light of each of the light source elements produces a Raman gain at the lower frequency side (i.e., the longer wavelength side) by the amount of Stokes shift corresponding to the pump wavelength. The total of the gains of the respective light source elements is the Raman gain of the forward Raman amplifier 13A. For example, in order to amplify a WDM signal of 1520 nm to 1625 nm, the pump source 131 outputs i pump beams, each having a wide wavelength range within the band of 1420 nm to 1500 nm. Pump beams with different wavelengths output from the respective light source elements may be combined by, for example, a multiplexer, and then multiplexed with the WDM signal and the supervisory channel by an optical coupler 132. The pump light is incident onto the fiber-optic transmission line 2 together with the WDM signal and the supervisory channel, and amplifies the WDM signal and the supervisory channel by stimulated Raman scattering occurring in the fiber optics.

At the receiver side of the optical transmission equipment 10A, a WDM signal and a supervisory channel sent from the optical transmission equipment 10B through the fiber-optic transmission line 3 are received. The WDM signal transmitted from the optical transmission equipment 10B has been amplified by the transmission amplifier 111 and the forward Raman amplifier 13B of the optical transmission equipment 10B. The backward Raman amplifier 15A provided at the receiver end of the fiber-optical transmission equipment 10A supplies the pump light into the fiber-optic transmission line 3 in the direction opposite to the travelling direction of the WDM signal and the supervisory channel from the optical transmission equipment 10B. Accordingly, the WDM signal and the supervisory channel are amplified before they enter the receiver side of the optical transceiver circuit 11A, and OSNR deterioration can be suppressed. Backward Raman pumping is less prone to gain saturation than forward Raman pumping, and can amplify the WDM signal and the supervisory channel at the output end of the fiber-optic transmission line 3 to flatten the optical loss in the propagation direction.

The backward Raman amplifier 15A has a pump source 151 and an optical filter 152. The pump source 151 includes a plurality of light source elements (for example, j laser diodes, where "j" is an integer greater than or equal to 2) with different wavelengths in order to amplify the signal light (and the supervisory channel) over the band of the WDM signal having travelled through the fiber-optic transmission line 3. The pump source 151 may have j laser diodes having oscillation wavelengths in the range of 1400 nm to 1500 nm. The number "I" of the light source elements included in the pump source 131 and the number "j" of light source elements included in the pump source 151 may be the same or different. The pump beams output from the respective light source elements of the pump source 151 may be combined by a multiplexer before they enter the optical filter 152. The optical filter 152 reflects the pump light toward the fiber-optic transmission line 3. The pump light enters the fiber-optic transmission line 3 in a direction opposite to the propagation direction, and causes stimulated Raman scattering in the fiber optics.

The WDM signal and the supervisory channel amplified by the backward Raman pumping pass through the optical filter 152 of the backward Raman amplifier 15A, and enter the receiver side of the optical transceiver circuit 11A. The receiver side of the optical transceiver circuit 11A has an optical filter 116, an OSC receiver 117, an optical splitter 118, an optical monitor (denoted as "PD" in the figure) 119, and a receiver amplifier 120. The OSC receiver 117 at the receiver side and the OSC transmitter 115 at the transmitter side configure an OSC processing unit 110A. The supervisory channel extracted by the optical filter 116 is supplied to the OSC receiver 117, and demodulated to extract the supervisory information. A portion of the WDM signal having passed through the optical filter 116 is split by an optical splitter 118, and monitored, together with the noise contained in the signal light, by the optical monitor 119. The WDM signal that has passed through the optical splitter 118 is amplified by the receiver amplifier 120, which may be called a post amplifier.

The receiver amplifier 120 is, for example, an EDFA, and ASE is generated. However, the WDM signal has been amplified by the backward Raman amplifier 15A whose noise is much lower than ASE, before incidence onto the receiver amplifier 120, and OSNR deterioration can be suppressed. The receiver side of the optical transceiver circuit 11A is connected to a plurality of optical transponders that deal with signals of different wavelengths. The WDM signal amplified by the receiver amplifier 120 is demultiplexed into optical signals of the respective wavelengths so as to be distributed to the corresponding optical transponders.

The optical transceiver circuit 11B, the forward Raman amplifier 13B, the backward Raman amplifier 15B, and the control device 20B of the optical transmission equipment 10B have the same configurations as the above-described optical transceiver circuit 11A, the forward Raman amplifier 13A, the backward Raman amplifier 15A, and the control device 20A, and they perform the same operations in the reverse direction.

<Functions of Controller>

Figure 3:
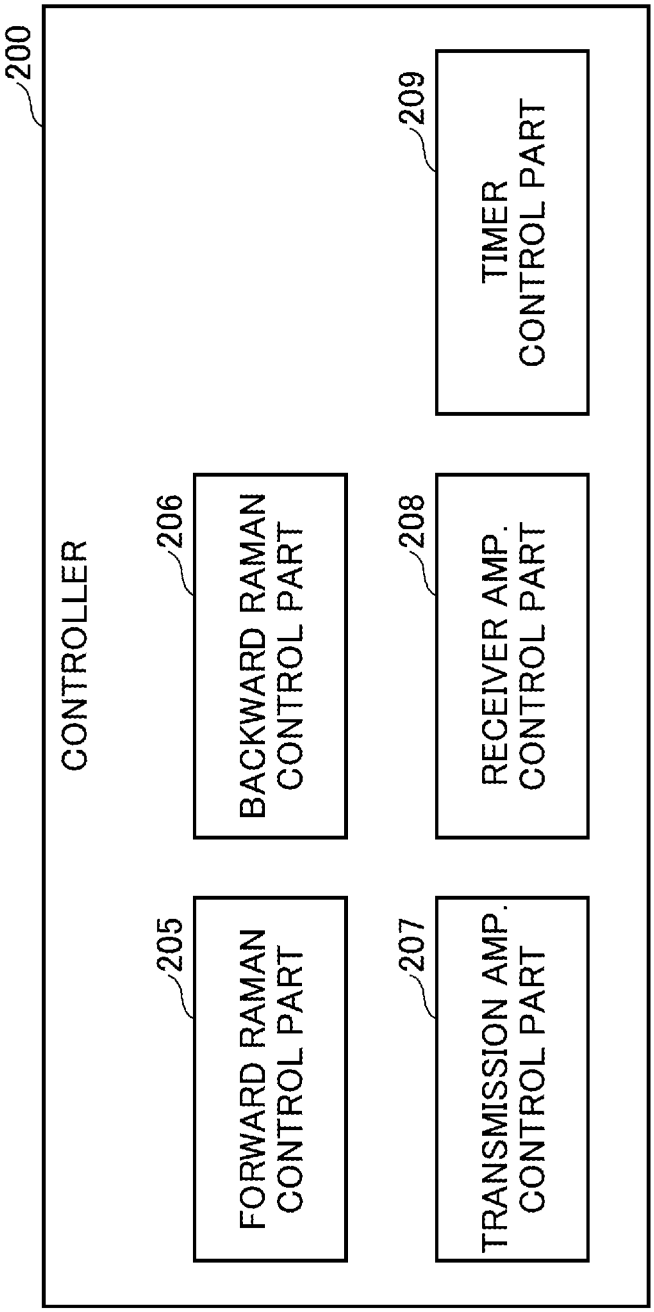
FIG. 3 is a functional block diagram of a controller implemented by a processor illustrated in FIG. 2.

FIG. 3 is a functional block diagram of a controller 200 implemented by the processor 201 of the control device 20A. The controller 200 has a forward Raman control part 205, a backward Raman control part 206, a transmission amplifier control part 207, a receiver amplifier control part 208, and a timer control part 209. The forward Raman control part 205 sets the pump power of the pump source 131 of the forward Raman amplifier 13A, and controls the ON/OFF operation of each of the light source elements, as well as the pump ratio. In particular, the pump power and the pump ratio of the forward Raman amplifier 13A are controlled such that a flat Raman gain spectrum can be acquired over the WDM signal band at the downstream, based on the power information of the upstream side (for example, the optical transmission equipment 10A) and the power information of the downstream side (for example, the optical transmission equipment 10B).

The backward Raman control part 206 sets the pump power of the pump source 151 of the backward Raman amplifier 15A, and controls the ON/OFF operation of each of the light source elements, as well as the pump ratio. In particular, the pump power and the pump ratio of the backward Raman amplifier 15A are controlled such that a flat Raman gain spectrum can be acquired over the WDM signal band at the downstream, based on the power information of the upstream side (for example, the optical transmission equipment 10B) and the power information of the downstream side (for example, the optical transmission equipment 10A).

The transmission amplifier control part 207 sets the gain of the transmission amplifier 111, and controls the shutdown timing of the transmission amplifier 111. The receiver amplifier control part 208 sets the gain of the receiver amplifier 120, and controls the shutdown timing. The timer control part 209 starts the timer 203 at a timing when the forward Raman amplifier 13A is turned off or powered down. When the timer 203 expires after a certain period of time, the timer control part 209 notifies the forward Raman control part 205 of the elapse of the time. Upon receiving the time elapse information, the forward Raman control part 205 turns on or increases the power of the forward Raman amplifier 13A. The timer control part 209 also activates the timer 203 at a timing when the backward Raman amplifier 15A is turned off or powered down, and notifies the backward Raman control part 206 of the time elapse information when the timer 203 expires. Upon receiving the time elapse information, the backward Raman control part 206 turns on or increases the power of the backward Raman amplifier 15A.

Figure 4:
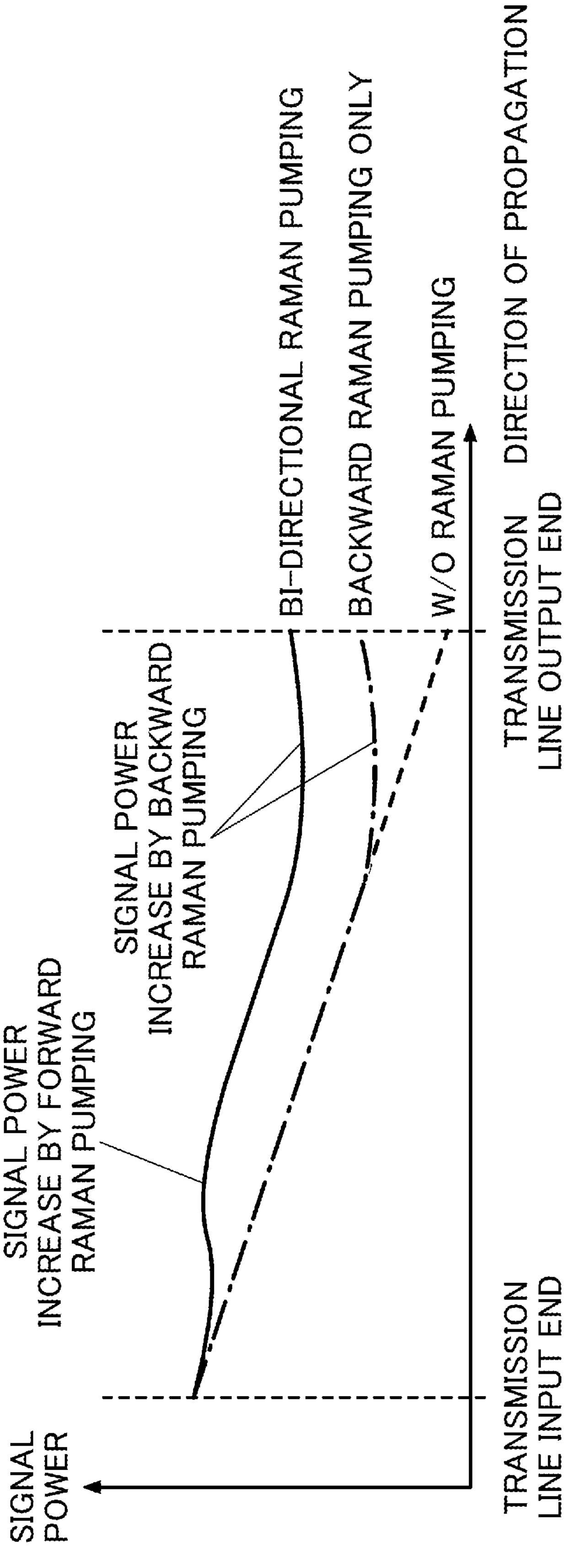
FIG. 4 illustrates the effect of bidirectional Raman pumping.

FIG. 4 illustrates the effect of bidirectional Raman pumping. Horizontal axis represents the direction of propagation, and the vertical axis represents the power of signal light. The power of the signal light incident onto the input end of the transmission line is amplified by forward Raman pumping. Then, as the signal light travels along the transmission line, the power of the signal light decreases due to optical loss in the transmission line. Before the output end of the transmission line, the power of the signal light is increased again by backward Raman pumping. As a result, the characteristic of optical loss along the transmission line can be flattened in the propagation direction, and the transmission distance can be extended by improving the OSNR.

Without Raman pumping, the power of signal light decreases as it travels along the transmission line. With backward Raman pumping only, the power of the signal light recovers to some extent at the vicinity of the output end of the transmission line. In this case, the OSNR can be improved as long as the distance of the transmission line is not so long. However, as the distance of the transmission line increases, the optical loss increases, and the OSNR enhancing effect becomes insufficient. The embodiment employs bidirectional Raman pumping, and at the same time, configures the system and the device to autonomously recover from interruption of OSC communication due to shutdown of Raman pumping during the startup process of a Raman amplifier.

<Start-Up Process of Bidirectional Raman Pumping>

Figure 5:
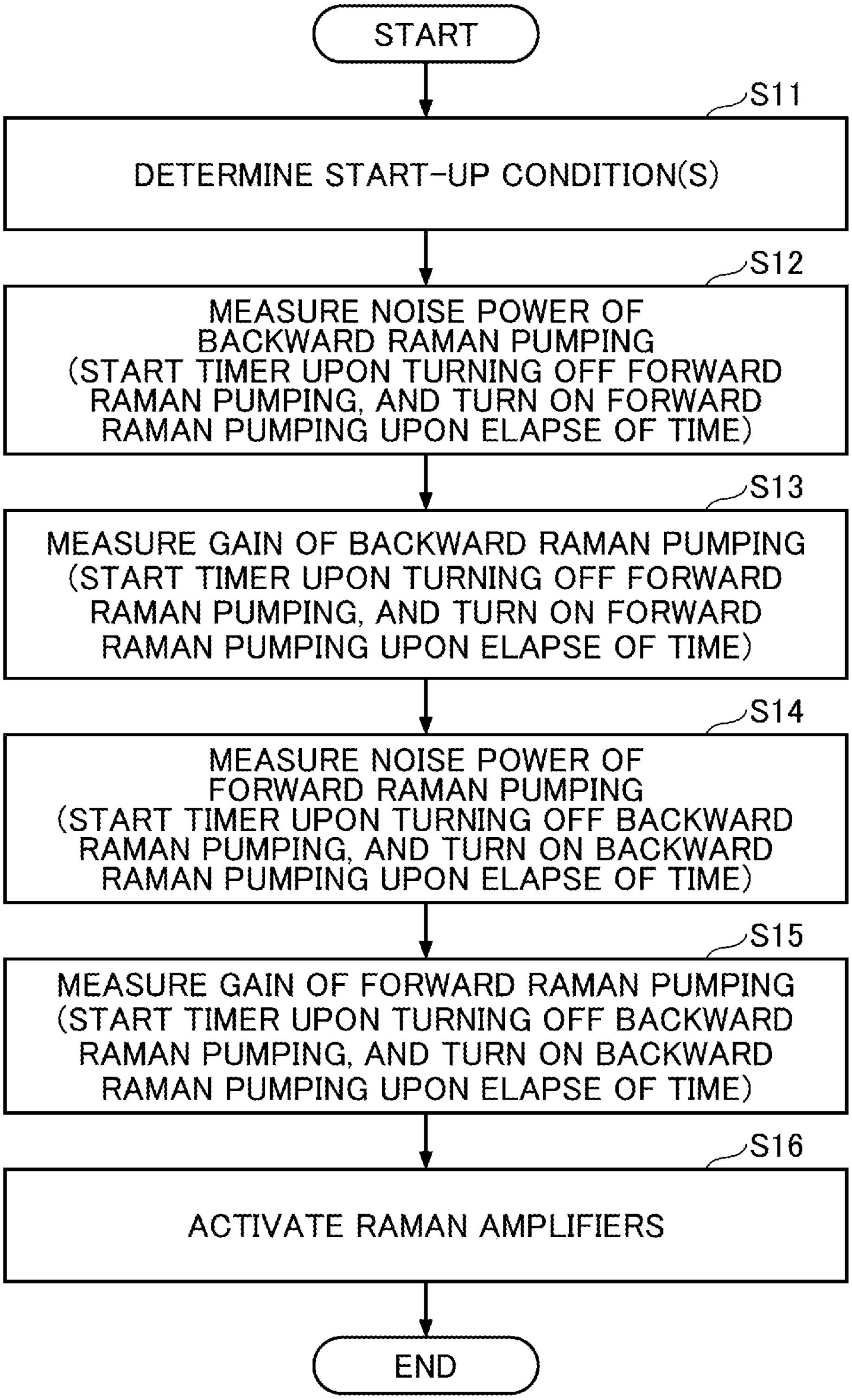
FIG. 5 is a flow chart of a start-up process of bidirectional Raman pumping.

FIG. 5 is a flow chart of a start-up process of bidirectional Raman pumping. First, a start-up condition is determined according to the magnitude of the span loss and the network configuration (S11). For example, the start-up condition may be determined depending on whether OSC communication can be maintained even if the pump light of a Raman amplifier is turned off or turned down. In this embodiment, a scenario is assumed that the distance of the transmission line is extended, and that OSC communication cannot be maintained unless both the forward Raman amplifier 13A and the backward Raman amplifier 15B (or the forward Raman amplifier 13B and the backward Raman amplifier 15A) facing each other across the transmission line are turned on.

Assuming that the optical transmission equipment 10A is an upstream node, and that the optical transmission equipment 10B is a downstream node, ASS noise and Raman gain of each of the forward Raman amplifier 13A and the backward Raman amplifier 15B are measured. The ASS noise of the backward Raman amplifier 15B is measured at the optical transmission equipment 10B (S12). For this measurement, the transmission amplifier 111 and the forward Raman amplifier 13A of the counterpart node, i.e., the optical transmission equipment 10A are turned off. Upon turning off the forward Raman amplifier 13A, the timer 203 of the optical transmission equipment 10A is started, and after a predetermined period of time, forward Raman pumping which has been turned off for the measurement is turned on. Every time ASS noise is measured for each of the light source elements of the pump source 151 of the backward Raman amplifier 15B, turning off and on of the forward Raman amplifier 13A is repeated. The time set in the timer 203 for activating the forward Raman amplifier 13A is longer than the time required to measure the noise of each of the light source elements of the pump source 151 of the counterpart backward Raman amplifier 15B.

The Raman gain of the backward Raman amplifier 15B is also measured at the optical transmission equipment 10B (S13). The Raman gain is determined by subtracting the ASS noise of the backward Raman amplifier 15B from the increase in sianal power owing to backward. Raman pumping. During this step, the forward Raman amplifier 13A of the optical transmlssion equipment 10A is turned off. Upon turning off the forward Raman pumping, the timer 203 of the optical transmission equipment. 10A is started, and after elapse of a predetermined period of time, the forward Raman pumping is turned on when the timer 203 has expired. Every time the Raman gain of each of the light source elements of the pump source 151 of the backward Raman amplifier 15B is measured, the forward Raman amplifier 13A is repeatedly turned off and rebooted from the off state. The time set in the timer 203 for recovery of the forward Raman amplifier 13A is longer than the time required to measure the gain of each of the light source elements of the pump source 151 of the counterpart backward. Raman amplifier 15B.

When the measurement of the ASS noise and. Raman gain of the backward Raman amplifier 15B is finished, the noise generated on the fiber-optic transmission line due to Raman scattering caused by the pump light incident from the pump source 151 is corrected based on the acquired noise information. The power levels of the j light source elements of the pump source 151 are also tuned, and startup of the backward Raman pumping is completed.

Then, ASS noise of the forward Raman amplifier 13A is measured at the optical transmission equipment 10B (S14). For this step, the transmission amplifier 111 of the optical transmission equipment 10A and the backward Raman amplifier 15B of the optical transmission equipment 10B are turned off. Upon turning off the backward Raman pumping, the timer 203 of the optical transmission equipment 10B is started. After a predetermined period of time, the backward Raman excitation is turned on because of the timer having expired. Every time the ASS noise of each of the light source elements of the pump source 131 of the forward Raman amplifier 13A is measured, the backward Raman amplifier 15B is repeatedly turned off and rebooted from the off state. The time set in the timer 203 for rebooting of the backward Raman amplifier 15B is longer than the time required to measure the noise of each of the light source elements of the pump source 131 of the forward Raman amplifier 13A.

Raman gain of the forward Raman amplifier 13A is also measured at the optical transmission equipment 10B (S15). For this step, the backward Raman amplifier 15B of the optical transmission equipment 10B is turned off. Upon turning off the backward Raman pumping, the timer 203 of the optical transmission equipment 10B is started, and after a predetermined period of time having elapsed, the backward Raman pumping is turned on because the time has expired. The backward Raman amplifier 15B is repeatedly turned off and rebooted from the off state every time the Raman gain of the pump light emitted from each of the plurality of light source elements of the pump source 131 of the forward Raman amplifier 13A is measured. The time set in the timer 203 for rebooting of the backward Raman amplifier 15B is longer than the time required to measure the gain of each of the light source elements of the pump source 131 of the forward Raman amplifier 13A.

When the measurement of the ASS noise and. Raman gain of the forward Raman amplifier 13A is finished, the pump power levels set for the i light source elements of the pump source 131 are corrected based on the acquired noise information, and startup of the forward Raman pumping is complete.

After the startup of forward Raman pumping and backward Raman pumping is completed, both the forward Raman amplifier 13A and the backward Raman amplifier 15B are turned on. The transmission amplifier 111 of the optical transmission equipment 10A and the receiver amplifier 120 of the optical transmission equipment 10B are also activated (S16). As a result, the start-up process is completed, and the signal communication is established.

In the bidirectional Raman pumping startup process of the embodiment, every time either one of the forward Raman amplifier 13A or the backward Raman amplifier 15B is turned off for the noise and gain measurement, the deactivated Raman amplifier is configured to autonomously recover from the off state after a predetermined time having elapsed. With this configuration, the time duration of interruption of the OSC communication is minimized, and information items required for setting up bidirectional Raman pumping can be transmitted and received via the OSC signals without much delay.

<Noise Measurement For Backward Raman Pumping>

Figure 6:
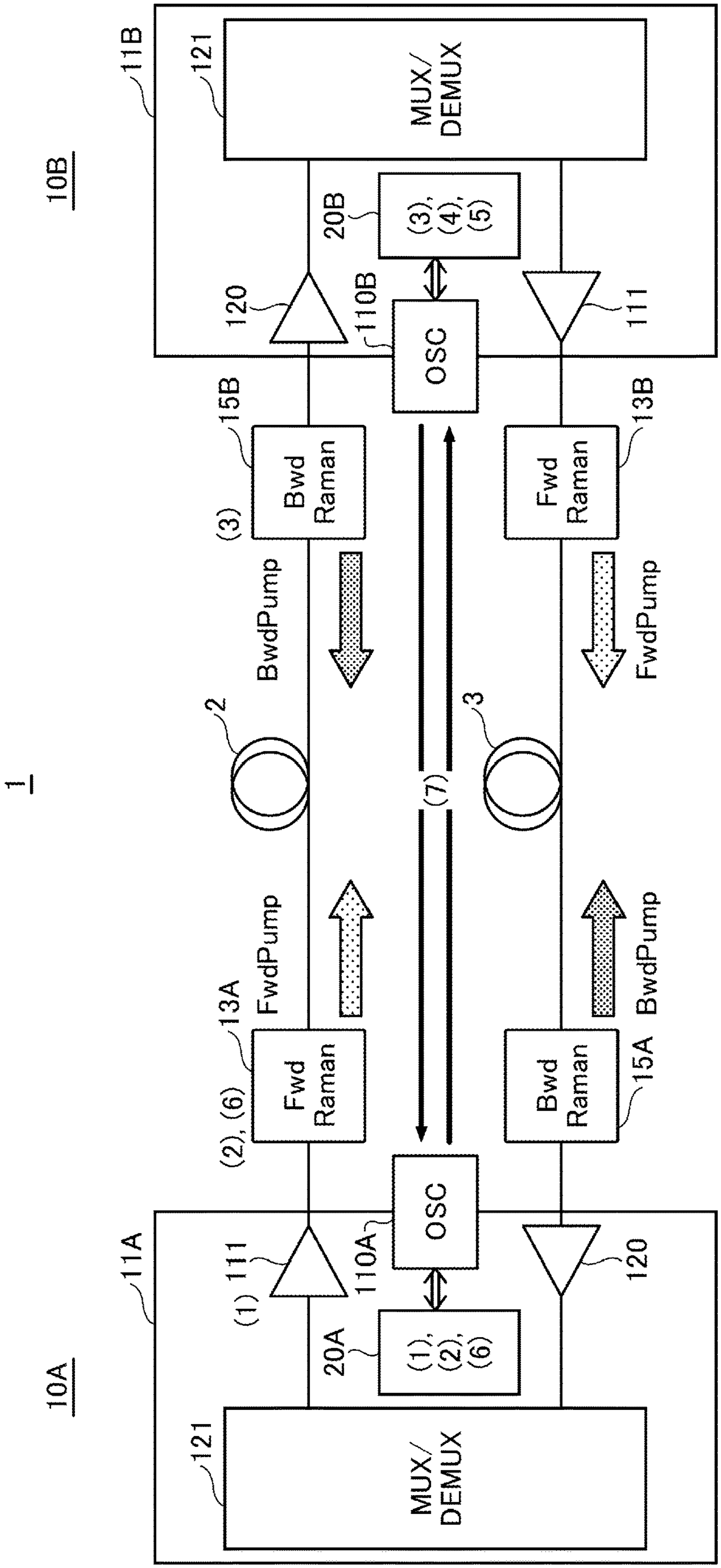
FIG. 6 is a schematic diagram illustrating a noise measurement sequence for a backward Raman amplifier.
Figure 7:
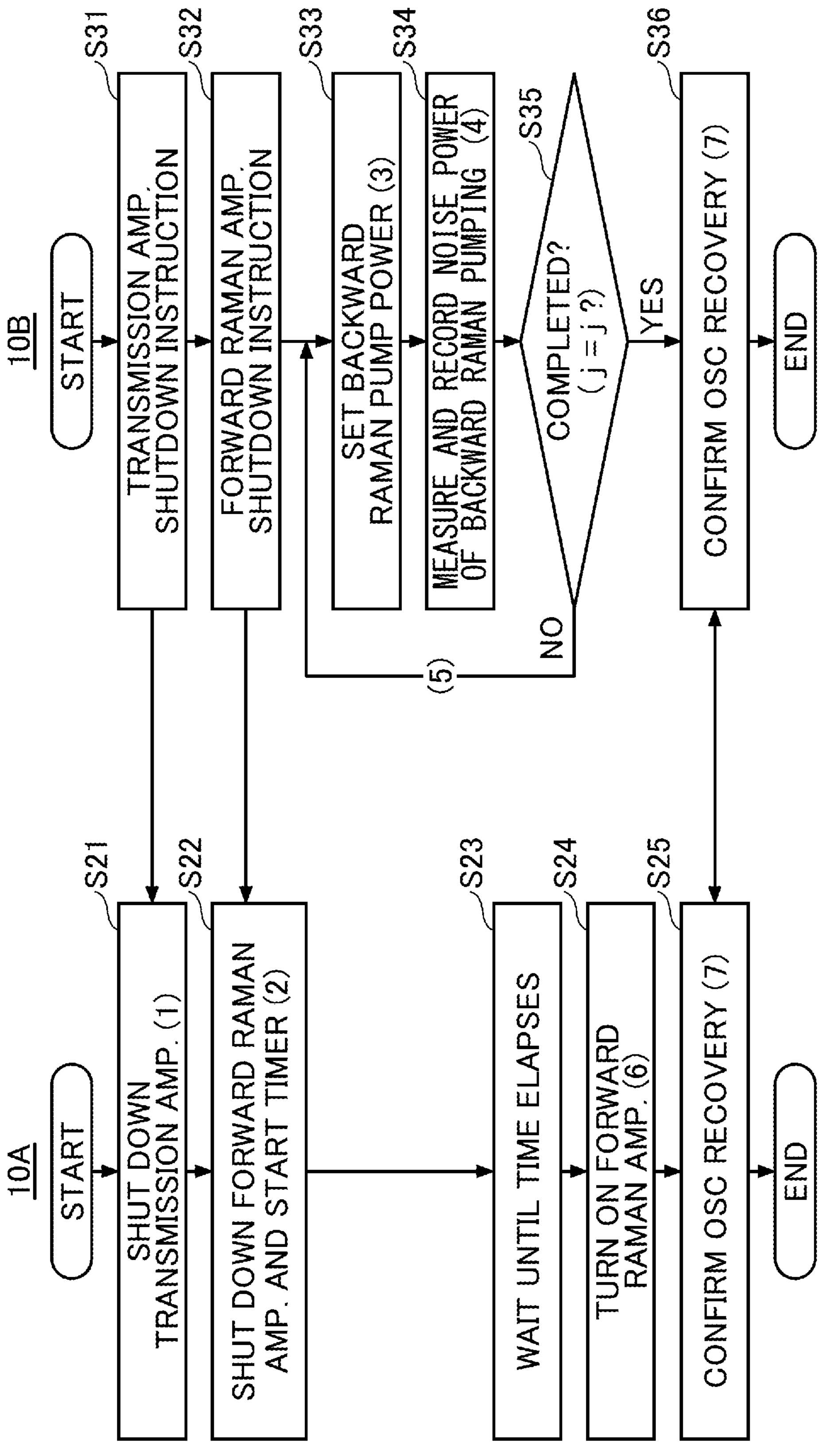
FIG. 7 is a flowchart of the operation performed in FIG. 6.

FIG. 6 is a schematic diagram of a noise measurement sequence of the backward Raman amplifier, and FTG. 7 is a flow chart of the operation performed in FIG. 6. With the optical transmission equipment 10A as an upstream node and the optical transmission equipment 10B as a downstream node, ASS noise of backward Raman pumping on the fiber-optic transmission line 2 is measured at the optical transmission equipment 10B. ASS noise measurement of backward Raman pumping on the fiber-optic transmission line 3 is the same process as that of noise measurement of the backward Raman pumping on the fiber-optic transmission line 2, except that the operation is reversed. The configurations of the optical transmission equipment 10A and the optical transmission equipment 10B are simplified in FIG. 6 for promoting the understanding of the disclosure. Actually, the forward Raman amplifier 13A and the backward Raman amplifier 15A are connected to the control device 20A through electrical control lines, as illustrated in FIG. 2. Similarly, the forward Raman amplifier 13B and the backward Raman amplifier 15B are connected via electric control lines to the control device 20B.

The optical transmission equipment 10B which measures the noise of the backward Raman amplifier 15B sends an instruction to the optical transmission equipment 10A to shut down the transmission amplifier 111 (S31). Specifically, the control device 20B of the fiber-optic transmission apparatus 101 instructs the OSC processing unit 1105 to generate and transmit an OSC signal containing the shutdown instruction. The OSC transmitter 115 generates the OSC signal containing the instruction, and transmits the OSC signal through the fiber-optic transmission line 3. The OSC processing unit 110A of the optical transmission equipment 10A demodulates the OSC signal containing the shutdown instruction, and supplies the demodulated information to the control device 20A. The control device 20A shuts down the transmission amplifier 111 according to the shutdown instruction (S21). This sequence corresponds to operation (1) in FIG. 6.

The optical transmission equipment 10B instructs the optical transmission equipment 10A to shut down the forward Raman amplifier 13A (S32). This shutdown instruction is also sent on the OSC. The instruction to shut down the transmission amplifier 111 (S31) and the instruction to shut down the forward Raman amplifier 13A (S32) may be sent at the same time, or in no particular order. The control device 20A of the optical transmission equipment 10A shuts down the forward Raman amplifier 13A according to the shutdown instruction, and starts a timer (S22). This sequence corresponds to operation (2) in FIG. 6. Upon the shutdown of the forward Raman amplifier 13A, OSC communication between the two sets of optical transmission equipment 10A and 10B is interrupted.

The control device 20B of the optical transmission equipment 10B sets pump power for each of the light source elements of the pump source 151 of the backward Raman amplifier 15B (S33), and measures the noise level in backward Raman pumping (S34). The noise level in backward Raman pumping may be detected by a photodetector provided inside the backward Raman amplifier 15B, or may be detected by the optical monitor 119 of the optical transceiver circuit 11B. Steps S33 and S34 are repeated until noise measurement has been completed for all of the j light source elements (YES in S35) to create a backward Raman noise profile. This sequence corresponds to operations (3), (4), and (5) in FIG. 6.

The control device 20A of the optical transmission equipment 10A waits for the time set in the timer to elapse (S23), and turns on the forward Raman amplifier 13A when the timer expires (S26). This sequence corresponds to operation (6) in FIG. 6. The OSC communication between the two sets of optical transmission equipment 10A and 10B recovers upon turning on the forward Raman amplifier 13A. The optical transmission equipment 10A and the optical transmission equipment 10B mutually confirm the OSC communication recovered at the respective OSC processing units 110A and 110B (S25 and S26). Recovery of the OSC can be confirmed by checking the OSC power level or the validity of the OSC packet. This sequence corresponds to operation (7) in FIG. 6.

In this manner, the time duration of the off state of the forward Raman amplifier 13A is minimized during the noise measurement of the backward Raman pumping. The OSC communication is quickly restored, and the startup operation of bidirectional Raman pumping is carried out without much delay.

<Gain Measurement of Backward Raman Pumping>

Figure 8:
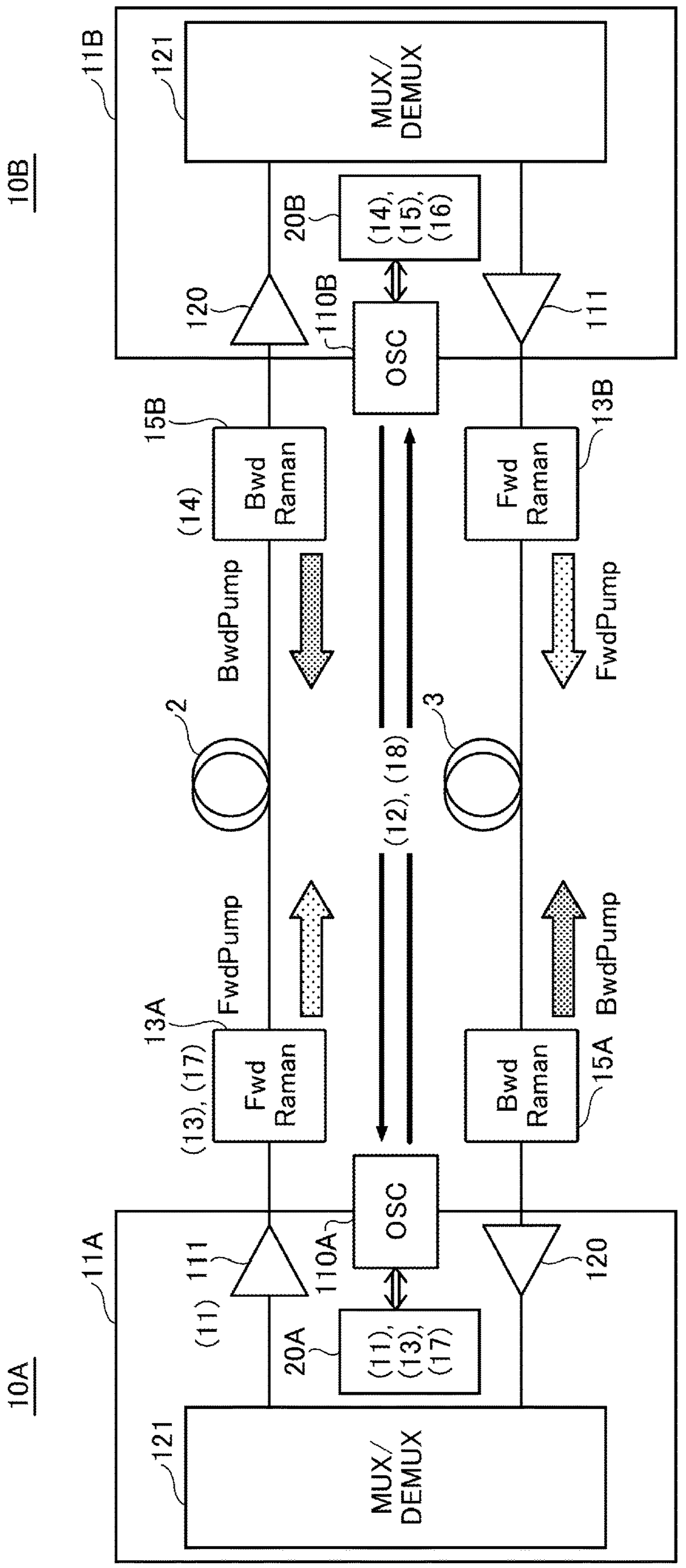
FIG. 8 is a schematic diagram illustrating a gain measurement sequence for a backward Raman amplifier.
Figure 9:
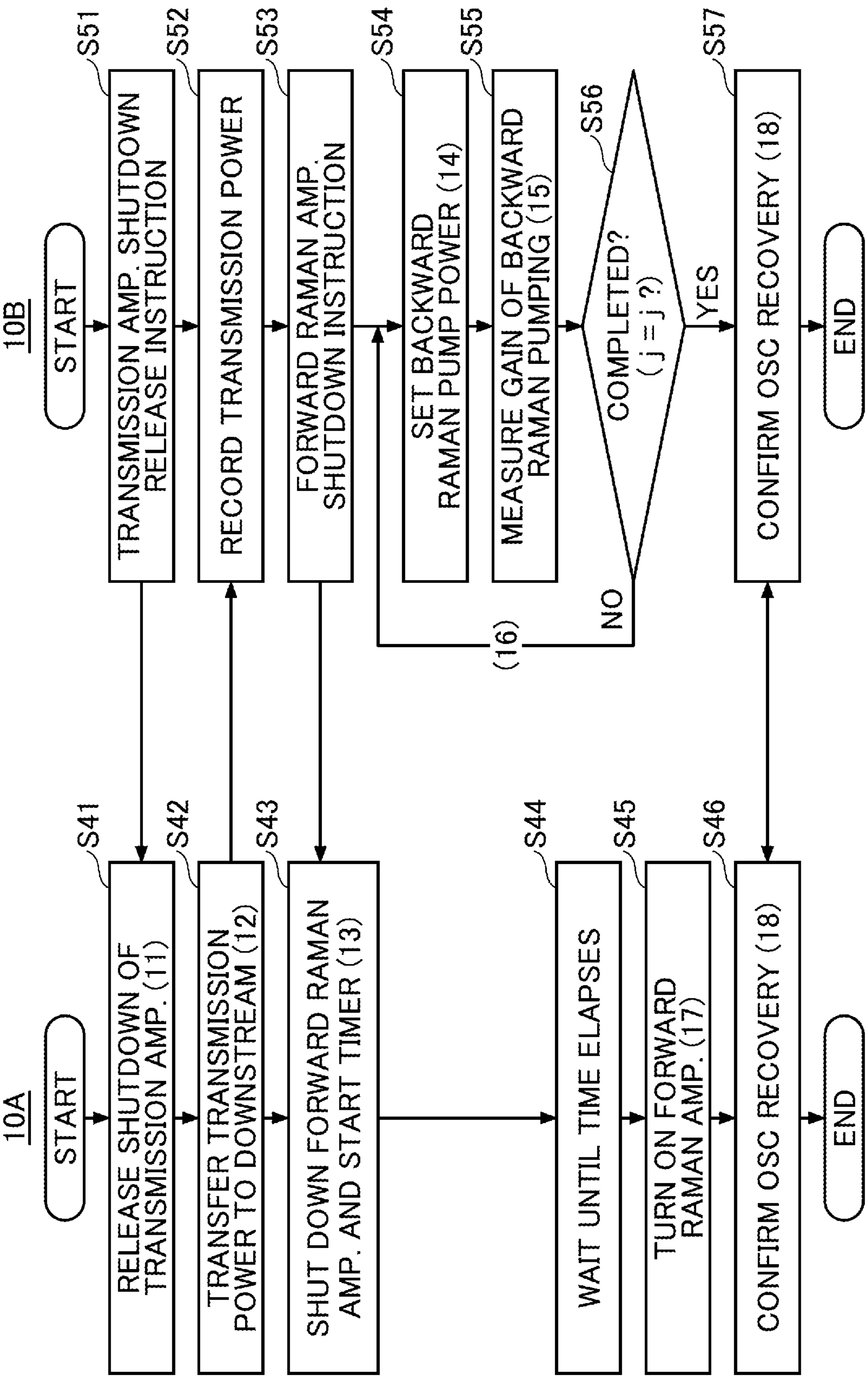
FIG. 9 is a flowchart of the operation performed in FIG. 8.

FIG. 8 is a schematic diagram of a gain measurement sequence of the backward Raman amplifier, and FIG. 9 is a flow chart of the operation performed in FIG. 6. With the optical transmission equipment 10A as an upstream node and the optical transmission equipment 10B as a downstream node, Raman gain produced on the fiber-optic transmission line 2 by backward Raman pumping is measured. Although the configurations of the two sets of optical transmission equipment 10A and 10B are simplified in FIG. 8, the forward Raman amplifier 13A and the backward Raman amplifier 15A are connected to the control device 20A via electric control lines, and the forward Raman amplifier 13B and the backward Raman amplifier 15B are connected to the control device 20B by electric control lines.

The optical transmission equipment 10B, which measures the gain of the backward Raman amplifier 15B, sends an instruction to the optical transmission equipment 10A to release the shutdown of the transmission amplifier 111 (S51). This shutdown release instruction is sent by OSC. The OSC processing unit 110A of the optical transmission equipment 10A demodulates the OSC signal containing the shutdown release instruction, and supplies the demodulated information to the control device 20A. The control device 20A releases the shutdown state of the transmission amplifier 111 according to the shutdown release instruction (S21). This sequence corresponds to operation (11) in FIG. 8.

The optical transmission equipment 10A transfers the transmission power information of the WDM signal to the optical transmission equipment 10B (S42). This step corresponds to operation (12) in FIG. 8. The control device 20B of the optical transmission equipment 10B records the received transmission power information in the memory 202 (S52). The control device 20B sends an instruction to shut down the forward Raman amplifier 13A to the optical transmission equipment 10A via the OSC processing unit 110B (S32). The control device 20A of the optical transmission equipment 10A shuts down the front Raman amplifier 13A according to the shutdown instruction, and starts a timer (S43). This sequence corresponds to operation (13) in FIG. 8.

The control device 20B of the optical transmission equipment 10B sets the pump power of each of the light source elements of the pump source 151 of the backward Raman amplifier 15B (S54), and measures the gain of the backward Raman pumping (S55). Steps S54 and S55 are repeated until the gain measurement has been completed for all of the light source elements (YES in S56) to create a backward Raman gain profile. This sequence corresponds to operations (14), (15) and (16) in FIG. 8.

Meanwhile, the control device 20A of the optical transmission equipment 10A waits for the elapse of time set in the timer (S44), and turns on the forward Raman amplifier 13A when the timer expires (S45). This sequence corresponds to operation (17) in FIG. 8. OSC communication between the two sets of optical transmission equipment 10A and 10B is restored upon recovery from the shutdown state of the forward Raman amplifier 13A. The optical transmission equipment 10A and the optical transmission equipment 10B mutually confirm the recovery of the OSC (S46 and S57). This sequence corresponds to operation (18) in FIG. 8.

In this way, the time duration of the shutdown state of the forward Raman amplifier 13A is minimized during the gain measurement of the backward Raman pumping. The OSC communication is quickly restored, and the startup process of bidirectional Raman pumping is carried out without much delay.

<Noise Measurement For Forward Raman Pumping>.

Figure 10:
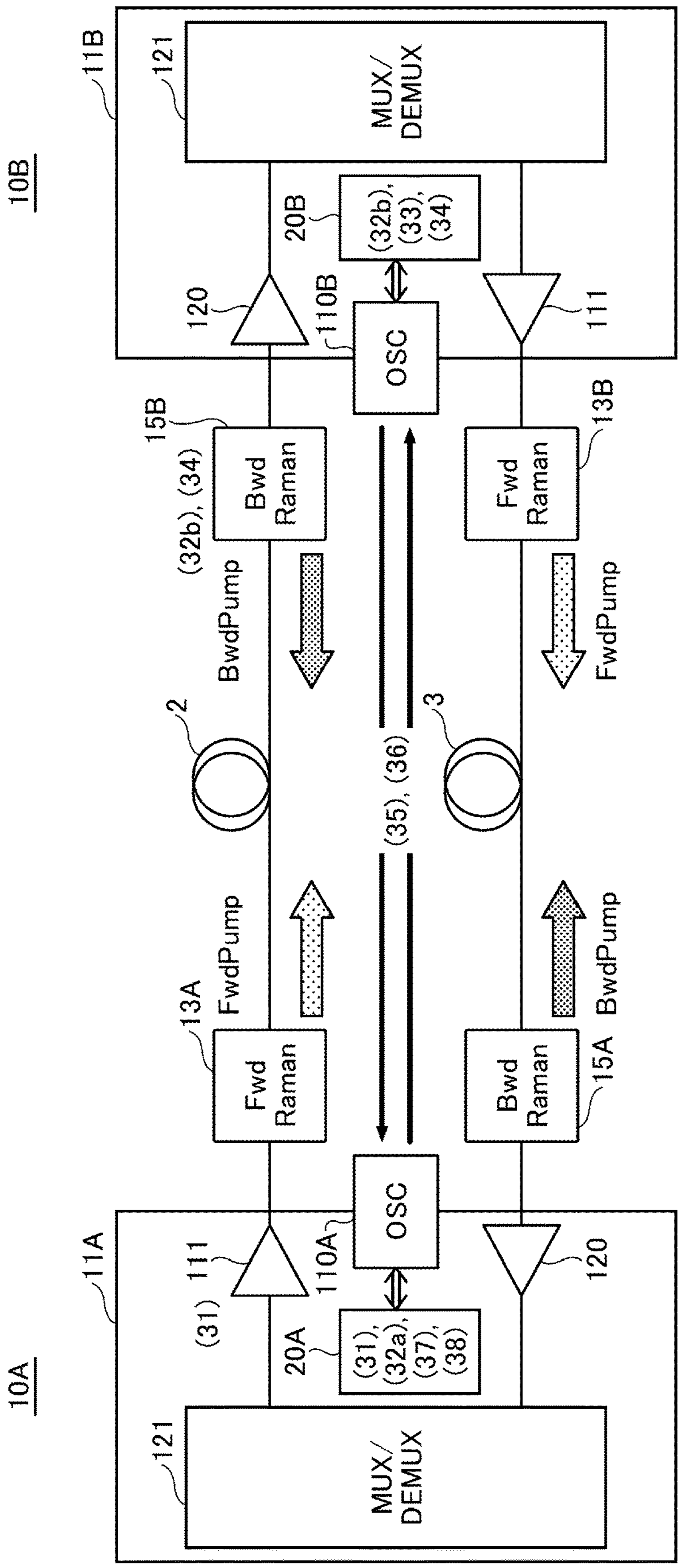
FIG. 10 is a schematic diagram of a noise measurement sequence for a forward Raman amplifier.
Figure 11:
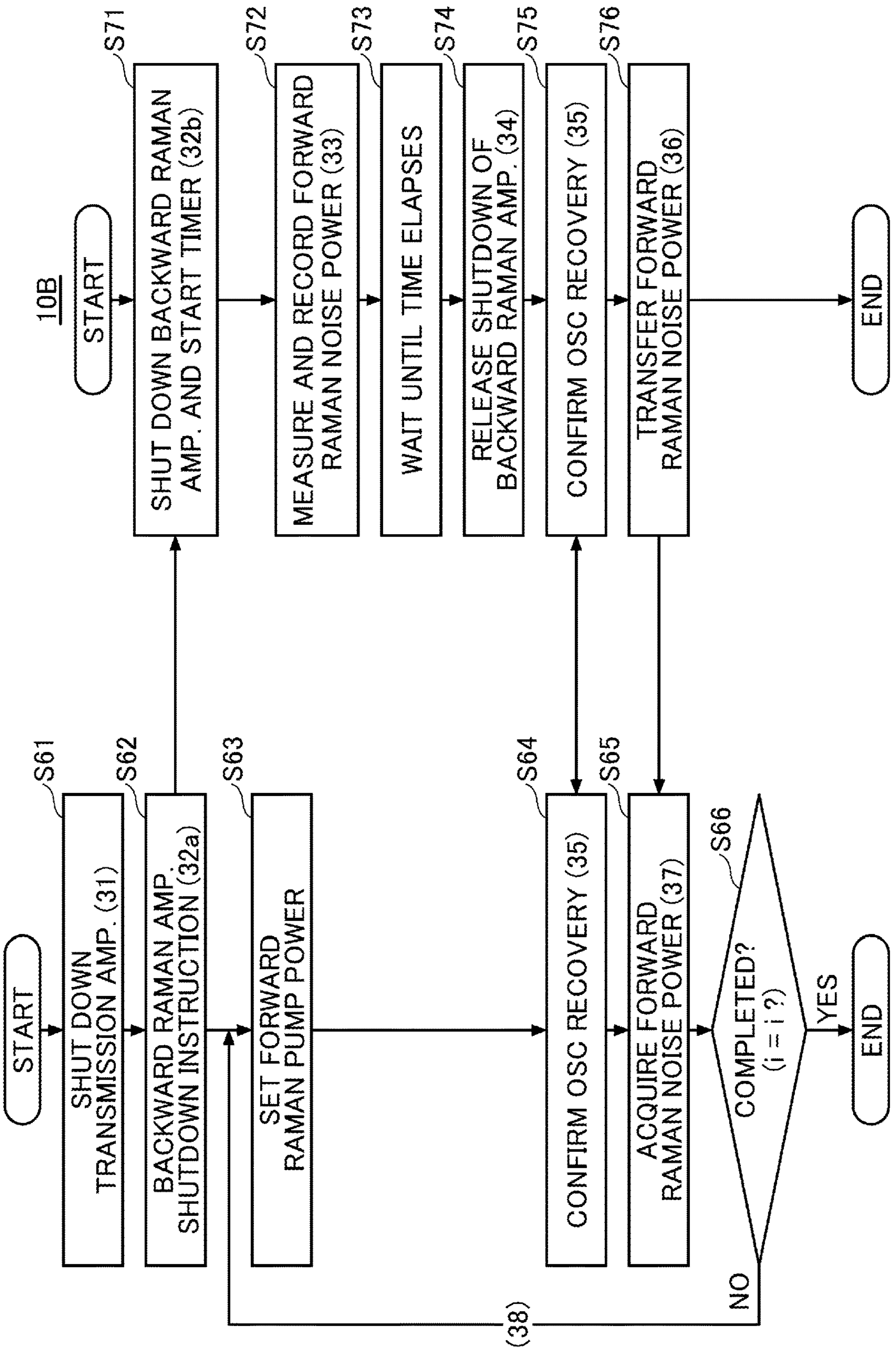
FIG. 11 is a flowchart of the operation performed in FIG. 10.

FIG. 10 is a schematic diagram of a noise measurement sequence of the forward Raman amplifier, and FIG. 11 is a flow chart of the operation performed in FIG. 10. With the optical transmission equipment 10A as an upstream node and the optical transmission equipment 10B as a downstream node, ASS noise of forward Raman pumping occurring on the fiber-optic transmission line 2 is measured. ASS noise measurement of forward Raman pumping on the fiber-optic transmission line 3 is the same process as that of noise measurement of the forward Raman pumping on the fiber-optic transmission line 2, except that the operation is reversed. Although the configurations of the two sets of optical transmission equipment 10A and 10B are simplified in FIG. 10, the forward Raman amplifier 13A and the backward Raman amplifier 15A are connected to the control device 20A via electric control lines, and the forward Raman amplifier 13B and the backward Raman amplifier 15B are connected to the control device 20B via electric control lines.

The control device 20A of the optical transmission equipment 10A shuts down the transmission amplifier 111 (S61), and sends an instruction to the optical transmission equipment 10B via the OSC processing unit 110A to shut down the backward. Raman amplifier 15B (S62). The shutdown instruction for the backward Raman amplifier 15B may include an instruction to start measuring ASS noise caused by forward Raman pumping. This sequence corresponds to operations (31) and (32*a*) in FIG. 10. Simultaneously with, or after or before the transmission of the shutdown instruction, pump powers are set for the respective light source elements of the pump source 131 of the front Raman amplifier 13A (S63).

The control device 20B of the optical transmission equipment 105 shuts down the backward Raman amplifier 15B and starts a timer, upon receiving the shutdown instruction from the OSC processing unit 1108 (S71). This sequence corresponds to operation (32*b*) in FIG. 10. At this stage of time, backward Raman pumping is turned off and OSC communication is interrupted.

The optical transmission equipment 10B records the noise level caused by forward Raman pumping (S72), and waits for the elapse of time (S73). This sequence corresponds to operation (33) in FIG. 10. The ASS Noise caused by forward Raman pumping may be measured by the optical monitor 119 of the optical transceiver circuit 11B. When the predetermined time has elapsed and the timer has expired, the control device 205 releases the shutdown state of the backward Raman amplifier 15B (S74). This sequence corresponds to operation (34) in FIG. 10. Thus, the OSC communication between the optical transmission equipment 10A and the optical transmission equipment 10B is restored.

The OSC processing unit 110A of the optical transmission equipment 10A and the OSC processing unit 1105 of the optical transmission equipment 10B mutually confirm the recovery of the OSC (S64 and S75). This sequence corresponds to operation (35) in FIG. 10. Upon recovery of the OSC, the optical transmission equipment 10B transfers the noise information due to forward Raman pumping to the optical transmlssion equipment 10A (S76). This sequence corresponds to operation (36) in FIG. 10.

Upon receiving the noise information due to forward Raman pumping at the optical transmission equipment 10A (S65), the control device 20A corrects the noise level of the pump source 131 as necessary, and adjusts the pump power. Steps S63 and S65 are repeated until noise correction and power adjustment have been completed for all of the light source elements (YES in S66). This sequence corresponds to operations (37) and (38) in FIG. 10. In this manner, the time duration in which the backward Raman amplifier 15B is turned off is minimized in the noise measurement of the forward Raman pumping. The CSC communication is quickly restored, and the startup process of the bidirectional Raman pumping is performed without much delay.

<Gain Measurement of Forward Raman Excitation>

Figure 12:
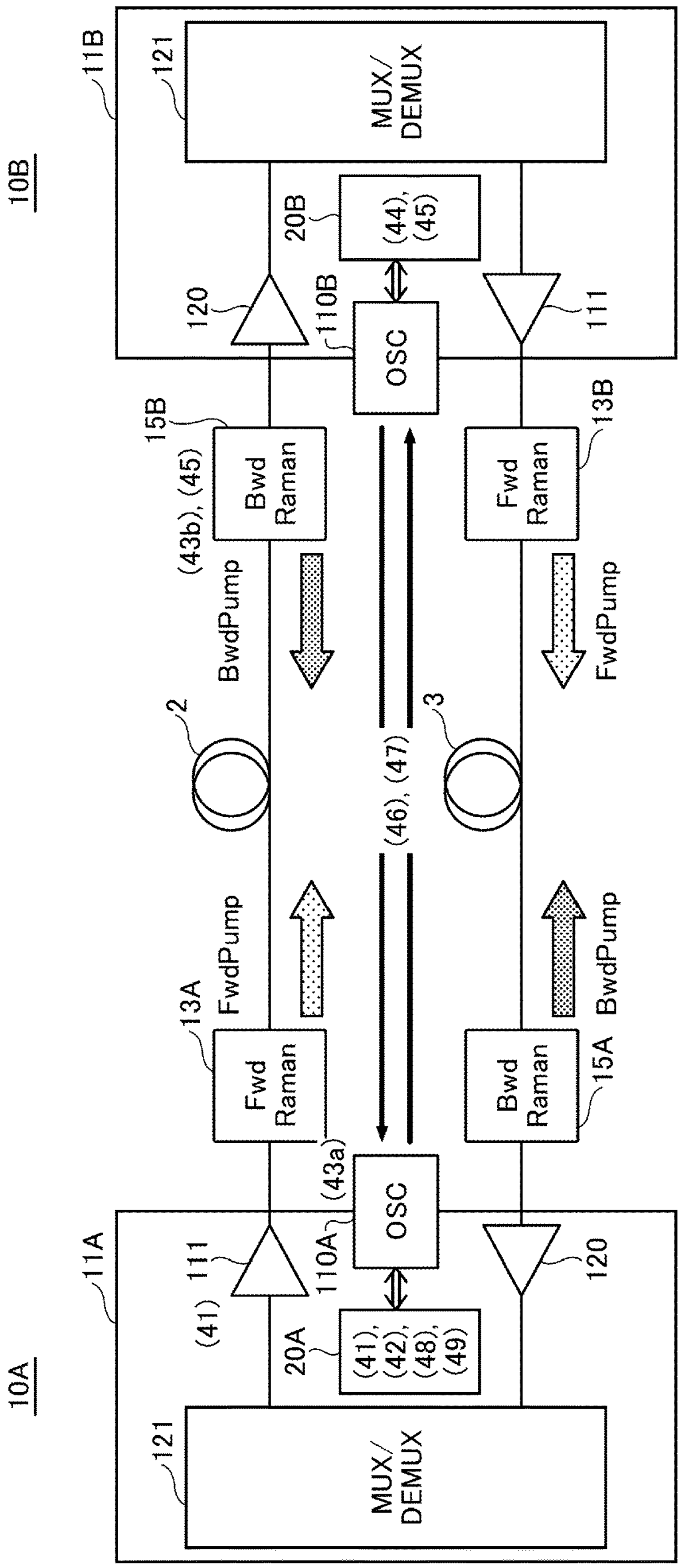
FIG. 12 is a schematic diagram of a gain measurement sequence for a forward Raman amplifier.
Figure 13:
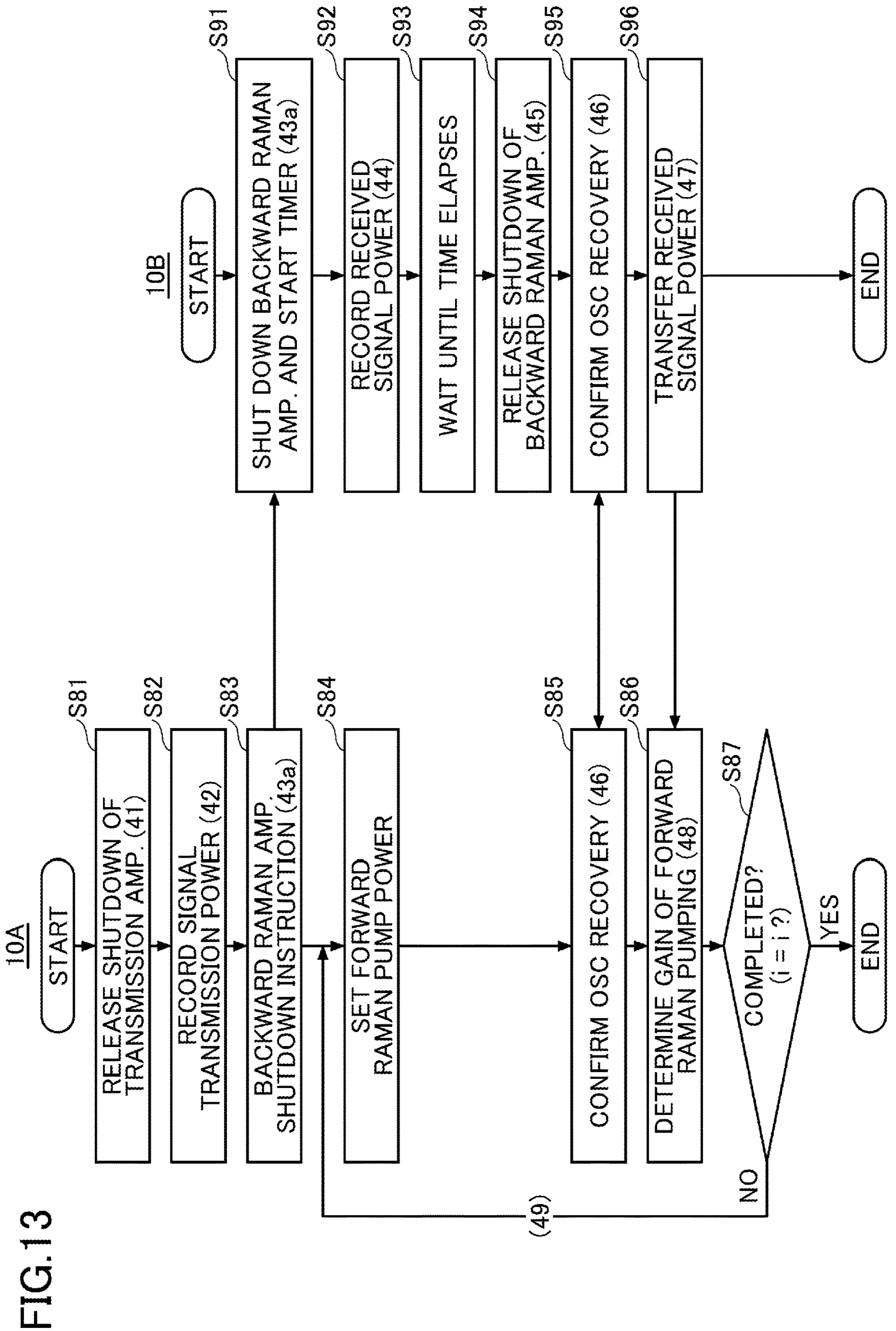
FIG. 13 is a flowchart of the operation performed in FIG. 12.

FIG. 12 is a schematic diagram of a gain measurement sequence of the forward Raman amplifier, and FIG. 13 is a flowchart of the operation performed in FIG. 12. With the optical transmlssion equipment 10A as an upstream node and the optical transmission equipment 10B as a downstream node, the Raman gain of forward Raman pumping on the fiber-optic transmission line 2 is measured. Although the configurations of the two sets of the optical transmission equipment 10A and 10B are simplified in FIG. 12, the forward Raman amplifier 13A and the backward. Raman amplifier 15A are connected to the control device 20A via electric control lines, and the forward Raman amplifier 13B and the backward Raman amplifier 15B are connected to the control device 20B by electric control lines.

The optical transmission equipment 10A releases the shutdown of the transmission amplifier 111 (S81), records the transmission power of the WDM signal, and transmits the WDM signal (S82). This sequence corresponds to operations (41) and (42) in FIG. 12. The control device 20A of the optical transmission equipment 10A sends an instruction to shut down the backward Raman amplifier 15B to the optical transmission equipment 10B via the OSC processor 110A (S83). This sequence corresponds to operation (43*a*) in FIG. 12. Simultaneously with, or before or after the transmission of the shutdown instruction, the power is set for each of the light source elements of the pump source 131 of the front Raman amplifier 13A (S84).

The control device 20B of the optical transmission equipment 10B shuts down the backward Raman amplifier 15B according to the shutdown instruction and starts a timer (S91). This sequence corresponds to operation (43*b*) in FIG. 12. At this point of time, OSC communication between the two sets of optical transmission equipment 10A and 10B is down. The optical transmission equipment 10B records the power level of the previously received WDM signal (S92), and waits for the elapse of time set in the timer (S93). Upon the elapse of time, the control device 20B releases the shutdown state of the backward Raman amplifier 15B (S94). This sequence corresponds to operations (44) and (45) in FIG. 12.

OSC communication is restored upon release of the shutdown state of the backward Raman amplifier 15B. The recovery of the OSC is confirmed between the two sets of optical transmission equipment 10A and 10B (S85 and S95). This sequence corresponds to operation (46) in FIG. 12. The optical transmission equipment 10B transfers the measurement result of the received signal power to the optical transmission equipment 10A (S96). This sequence corresponds to operation (47) in FIG. 12. The optical transmission equipment 10A calculates the gain of each of the light source elements of the pump source 131 based on the power information measured at the optical transmission equipment 10B (S86), and tunes the pump power (S84). Steps S84 and S86 are repeated until gain calculation and tuning of the pump power have been completed for all of the light source elements (YES in S87). This sequence corresponds to operations (48) and (49) in FIG. 12.

In this manner, the time duration in which the backward Raman amplifier 15B is turned off is minimized in the gain measurement process for forward Raman pumping. The OSC communication is quickly restored, and the startup process of bidirectional Raman pumping is performed without much delay.

Although the present disclosure has been described based on specific configurations and schemes, the present disclosure is not limited to the above-described configuration examples and operation processes. The technique of the present disclosure can be applicable to a case in which the power of either the backward Raman pump or the forward Raman pump decreases to the extent of interruption of OSC communication. In this application, the optical transmission equipment may be configured to automatically power up after a predetermined period of time when the power level of the OSC signal has fallen below a certain level. Measurement of the amplification characteristics of the Raman amplifier is not limited to ASS noise and. Raman gain, and other optical pumping properties induced by Raman scattering may be measured. Instead of providing a timer in the control device, a timer may be implemented by a function of the processor, or a timer may be provided inside the Raman amplifier. In either configuration, the shutdown state or the power-down state of any one of the two Raman amplifiers opposite across the fiber-optic transmission line can be released. Even if the distance of the fiber-optic transmission line is extended, the optical transmission system can autonomously recover from the interruption of OSC Communication when starting bidirectional Raman pumping, and necessary information required for the startup of the Raman pumping can be transmitted and received without much delay.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of superiority or inferiority of the invention. Although the embodiments of the present inventions have been described in detail, it should be understood that the various changes, substitutions, and alterations could be made hereto without departing from the scope of the invention.

What is claimed is:

1. An optical transmission equipment comprising:

an optical transceiver circuit including a transmitter and a receiver, wherein the transmitter that transmits signal light and supervisory light and the receiver that receives the signal light and the supervisory light;

a forward Raman amplifier arranged in the transmitter;

a backward Raman amplifier arranged in the receiver; and a processor that controls the forward Raman amplifier and the backward Raman amplifier, wherein when a counterpart backward Raman amplifier or a counterpart forward Raman amplifier provided at an opposite side through a fiber-optic transmission line is started up, the processor is configured to turn off a power of the forward Raman amplifier or the backward Raman amplifier according to a supervisory signal received from the fiber-optic transmission line, and to release an off state of the forward Raman amplifier or the backward Raman amplifier after a predetermined period of time.

2. The optical transmission equipment as claimed in claim 1, wherein the predetermined period of time is longer than a time required for measuring optical pumping characteristics of the counterpart backward Raman amplifier or the counterpart forward Raman amplifier provided at an opposite end of the fiber-optic transmission line.

3. The optical transmission equipment as claimed in claim 1, wherein the processor shuts down the forward Raman amplifier and starts a timer upon receiving a forward Raman amplifier shutdown instruction from a second optical transmission equipment across the fiber-optic transmission line, and releases a shutdown state of the forward Raman amplifier upon elapse of time set in the timer.

4. The optical transmission equipment as claimed in claim 1, wherein the processor shuts down the backward Raman amplifier and starts a timer upon receiving a backward Raman amplifier shutdown instruction from a second optical transmission equipment across the fiber-optic transmission line, and records a noise power or a signal power due to forward Raman pumping of the second optical transmission equipment.

5. The optical transmission equipment as claimed in claim 4, wherein the processor releases a shutdown state of the backward Raman amplifier upon elapse of time set in the timer, and transfers the noise power or the signal power to the second optical transmission equipment.

6. An optical transmission system comprising:

a first optical transmission equipment including a first forward Raman amplifier and a first backward Raman amplifier; and a second optical transmission equipment connected to the first optical transmission equipment via a fiber-optic transmission line and including a second forward Raman amplifier and a second backward Raman amplifier, wherein each of the first optical transmission equipment and the second optical transmission equipment includes a processor, and wherein when bidirectional Raman pumping is started between the first optical transmission equipment and the second optical transmission equipment, the processor of one of the first optical transmission equipment and the second optical transmission equipment is configured to:

receive a supervisory signal via the fiber-optic transmission line from other one of the first optical transmission equipment and the second optical transmission equipment, turn off a corresponding Raman amplifier, among the first forward Raman amplifier, the first backward Raman amplifier, the second forward Raman amplifier, and the second backward Raman amplifier, designated by the supervisory signal, and turn on the corresponding Raman amplifier after a predetermined period of time.

7. The optical transmission system as claimed in claim 6, wherein the predetermined period of time is longer than a time required for measuring optical pumping characteristics of a counterpart Raman amplifier located across the fiber-optic transmission line opposite to the corresponding Raman amplifier.

8. The optical transmission system as claimed in claim 6, wherein the first optical transmission equipment receives a shutdown instruction for the first forward Raman amplifier from the second optical transmission equipment when optical pumping characteristics of the second backward Raman amplifier is measured, and shuts down the first forward Raman amplifier and starts a timer, and wherein the first optical transmission equipment a shutdown state of the first forward Raman amplifier when the timer has expired.

9. The optical transmission system as claimed in claim 6, wherein the second optical transmission equipment receives a shutdown instruction for the second backward Raman amplifier from the first optical transmission equipment when optical pumping characteristics of the first forward Raman amplifier is measured, and shuts down the second backward Raman amplifier, and wherein the second optical transmission equipment starts a timer upon shutdown of the second backward Raman amplifier, and records a noise power or a signal power caused by the first forward Raman amplifier.

10. The optical transmission system as claimed in claim 9, wherein the second optical transmission equipment releases a shutdown state of the second backward Raman amplifier when the timer has expired, and transfer the noise power or the signal power to the first optical transmission equipment.

11. A Raman amplifier control method comprising:

at an optical transmission equipment including a forward Raman amplifier and a backward Raman amplifier, turning off a power of the forward Raman amplifier or the backward Raman amplifier according to a supervisory signal received from a fiber-optic transmission line when the forward Raman amplifier or the backward Raman amplifier is started up, and after a predetermined period of time, autonomously releasing a power-off state of the forward Raman amplifier or the backward Raman amplifier.

12. The Raman amplifier control method as claimed in claim 11, wherein the predetermined period of time is longer than a time required for measuring optical pumping characteristics of a counterpart backward Raman amplifier or a counterpart forward Raman amplifier provided at an opposite end of the fiber-optic transmission line.

* * * * *